United States Patent [19]
Cross, Sr.

[11] 3,828,835
[45] Aug. 13, 1974

[54] DELIMBING METHOD AND APPARATUS

[76] Inventor: J. Stanton Cross, Sr., 1601 7th Ave., Conway, S.C. 29526

[22] Filed: Aug. 16, 1973

[21] Appl. No.: 388,854

[52] U.S. Cl............ 144/309 AC, 144/2 Z, 214/145
[51] Int. Cl............................................. B27c 9/02
[58] Field of Search............ 214/145; 144/2 Z, 2 R, 144/3 R, 3 D, 34 R, 208 R, 208 H, 309 R, 309 AC, 311

[56] References Cited
UNITED STATES PATENTS

| 2,415,601 | 2/1947 | Milward............... 144/208 H X |
| 2,927,613 | 3/1960 | Franzen et al................ 144/2 N |
| 3,491,810 | 1/1970 | Williams..................... 144/309 AC |
| 3,719,217 | 3/1973 | Bottoms........................... 144/2 Z |
| 3,735,788 | 5/1973 | Coughran, Jr.............. 144/2 Z X |

Primary Examiner—Andrew R. Juhasz
Assistant Examiner—W. D. Bray
Attorney, Agent, or Firm—A. Yates Dowell, Jr.

[57] ABSTRACT

An apparatus and method for removing limbs from trees in which a roller is mounted for vertical displacement on a skidder or other vehicle and operates during successive passes of the vehicle over a plurality of generally parallel arranged felled trees to crush or strip the branches from above and below the trunks.

5 Claims, 4 Drawing Figures

PATENTED AUG 13 1974 3,828,835

DELIMBING METHOD AND APPARATUS

BACKGROUND OF THE INVENTION

1. Field of the Invention

This invention relates generally to the harvesting of pulpwood and the like and relates specifically to removing limbs from a plurality of felled trees simultaneously.

2. Description of the Prior Art

Heretofore there have been many methods and various types of tools and vehicles developed and designed specifically for use in delimbing trees. The most widely used methods are those of hand cutting or chain sawing the branches after the tree is felled. However, not only can such methods be extremely difficult and time-consuming, they frequently present safety hazards. All too often, when the tree is cut down, the branches which are below the trunk as it falls cause portions of the trunk to be elevated a substantial distance above the ground. In order to remove the limbs, a workman may be required to either walk the unstable elevated trunk section or perform work which is elevated from a normally safe working plane. Further difficulties in the hand cutting and chain sawing methods are encountered because the workman must often position himself between branches which extend in various directions and thus must work in extremely awkward and often unsafe positions.

In more recent years, some mechanized delimbing devices have been developed. These devices utilize stripper blades, shears, or saws to sever tree limbs either before or after the trees are felled. However, these machines usually require that the trees be handled on a one-by-one basis, a technique requiring that a great deal of time and work energy be expended per tree. Examples of the prior art include U.S. Pat. Nos. 3,074,446 to Earl; 3,633,638 to Groves; 3,643,709 to Lindblom; 2,959,201 to LeTrouneau; and 2,003,186 to Glassner.

SUMMARY OF THE INVENTION

An implement and method for delimbing trees in which the implement consists of an elongated roller which is mounted for vertical adjustment on a skidder or other vehicle. In order to perform the delimbing operation, several felled trees are arranged in substantially parallel relationship having the top and butt end of one tree adjacent the top and butt end respectively of each of the other trees. The skidder or other vehicle straddles the trees, and with the roller slightly elevated above the trunk, the vehicle proceeds from the top ends to the butt ends causing an initial fracturing of the branches at their junctions with the trunks. The roller is then brought into a pressured engagement with the trunks, and as the vehicle reverses its direction, the pressure from the roller causes the branches underneath the trunks to be crushed while the roller action completes the severing or crushing of the branches which are generally above the trunk.

It is an object of this invention to provide a method and implement for delimbing trees which will enable a skidder or other vehicle to be used efficiently to simultaneously remove the limbs from above and below a plurality of felled trees, thereby allowing the limbs which remain on the trunk and which lie in a plane substantially parallel with the ground to be quickly and safely removed by various hand sawing or cutting methods.

It is a further object of this invention to provide a method and implement for delimbing trees which will effectively remove the limbs from above and below a plurality of felled trees without causing damage to the trunks of the trees.

DESCRIPTION OF THE PREFERRED EMBODIMENT

Figure 1:
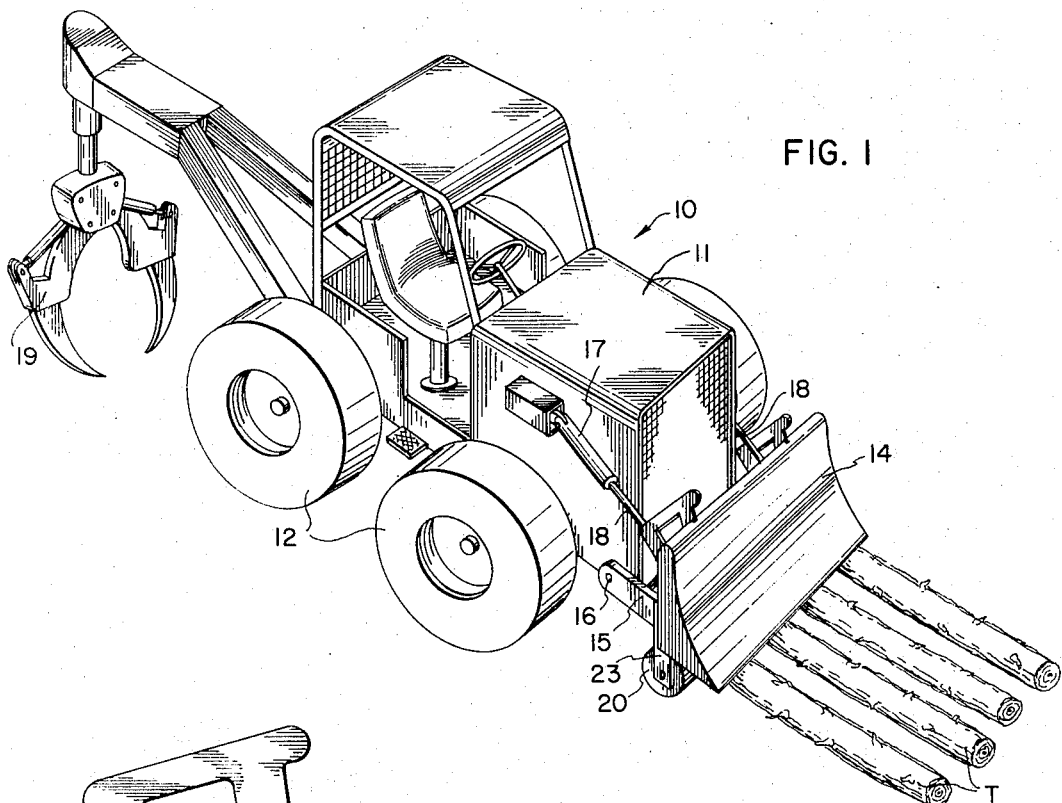
FIG. 1 is a front perspective view illustrating one application of the invention.

With continued reference to the drawing, a logging vehicle 10, such as a skidder or the like used in the harvesting of pulpwood, has a body 11 supported on ground-engaging wheels 12. A blade 14, normally used for stacking and arranging felled trees as well as pushing underbrush and cut limbs into a pile, extends across the front of the skidder and is mounted on a pair of relatively short support arms 15 which are swingably mounted on pivot pins 16 at opposite sides of the body 11. A hydraulic cylinder 17 is located on each side of the skidder body 11 and each cylinder has a piston rod 18 connected to the support arms 15 for controlling the vertical movement thereof. The skidder is also shown as having a rearwardly mounted grapple attachment 19 with which logs and cut trees can be pulled or lifted.

In order to remove a substantial portion of the limbs of trees after such trees have been felled, an elongated delimbing roller 20 is provided having stub shafts 21 extending outwardly from each end along the central axis thereof. The shafts 21 are rotatably supported in the bearings 22 which are provided in each of a pair of hanger brackets 23. The brackets 23 are attached to the support arms 15 adjacent the rear of the blade, and extend downwardly therefrom. Although the roller 20 can be of any desired size, a roller having a diameter of approximately 7 inches and a length substantially equal to the length of the blade 14 has been found to be satisfactory.

Figure 2:
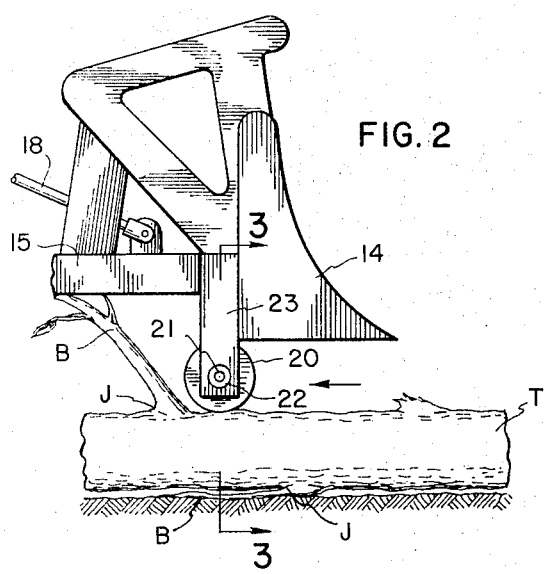
FIG. 2 is a side elevation of the invention mounted adjacent to the rear and lower portion of the blade of a skidder or other vehicle.
Figure 4:
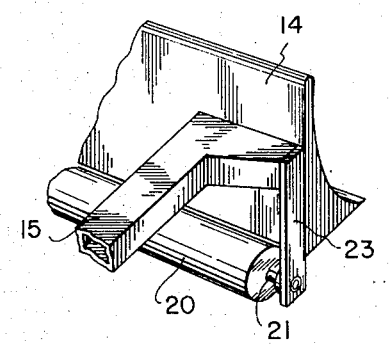
FIG. 4 is a fragmentary rear perspective view of the invention as shown in FIG. 2.
Figure 3:
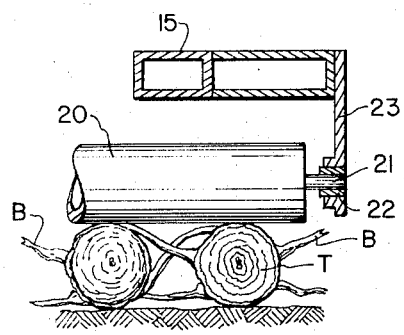
FIG. 3 is a section along the line 3—3 of FIG. 2.

The delimbing roller 20, as shown in FIG. 2, is mounted so as to extend below the rear and lower portion of the blade. However, the roller could be effectively utilized when mounted in various other positions on the support arms 15. Preferably, the upper portion of the roller 20 is substantially in alignment with the lower surface of the blade 14 so that the roller is located below the blade when the support arms 15 are in a substantially horizontal position. Due to the relatively short length of the support arms 15, the leading edge of the blade substantially engages the ground to perform its normal function when such arms are lowered.

In the operation of the device, after the trees have been felled, the operator of the skidder uses the blade to position several of the cut trees T adjacent to each other in such a manner that the top and butt ends of one tree are adjacent the respective top and butt ends of the other trees. The operator then moves the vehicle into alignment with the trunks of the trees and adjacent to the tops thereof. In this position, the arms 15 are raised so that the blade 14 and roller 20 are above the trunks of a plurality of trees and the vehicle is moved down the lengths of the trees while straddling the trunks. As the vehicle moves down the length of the trunk, the blade and/or roller engage the branches B extending upwardly from the trunk thereby causing such branches to be bent backward and cracked at a point near their junction J with the tree trunk.

After the branches have been cracked, the arms 15 are lowered by the fluid cylinders 17 so that the roller 20 engages the trunks and applies a downward pressure thereto. The direction of movement of the vehicle is reversed and rearward movement of the vehicle and roller causes the cracked branches, or stubs remaining from branches broken off during the initial pass, to be severed and/or crushed. Besides the action of the roller on the branches which are exposed along the upper surfaces of the trunks, the downward force created by the fluid cylinders causes the branches which are underneath the trunks to be crushed or cracked. The crushing of the lower branches allows the trunks to settle to a relatively horizontal and stable position with respect to the ground.

The delimbing operation thus removes the upper and lower branches from a plurality of felled trees simultaneously. The operation leaves only the branches which extend substantially parallel to the ground to be easily and safely removed by conventional hand cutting or sawing techniques.

I claim:

1. A method for delimbing a plurality of felled trees comprising the steps of: bending the upwardly extending branches of said trees in a first direction, bringing a roller into a pressured engagement with the upper surface of the trunks of said trees, rolling said trees along a second direction, said second direction being the opposite direction of said first direction, whereby the bending of the branches in said first direction causes an initial fracture adjacent the joint of said upwardly extending branches with said trunks of said trees and said pressured rolling in said second direction completes said initial fracture of said upwardly extending branches and simultaneously crushes downwardly extending branches beneath said trunk at a point adjacent their junction with said trunk.

2. A method for delimbing a plurality of felled trees utilizing a vehicle having vertically adjustable roller means attached thereto comprising the steps of:
   positioning a plurality of said felled trees generally parallel with one another and in a manner to have the top and butt end of one of said trees adjacent the top and butt end of one of the other of said trees so that all of said trees lie in the same general direction from butt end to top,
   straddling said felled trees with said vehicle, moving said vehicle in a direction from said top ends to said butt ends,
   while engaging the upwardly extending branches of said trees at a point above the junction of said upwardly extending branches with the trunks of said trees thereby causing an initial fracture adjacent said junction,
   lowering said roller means into pressured engagement with the upper surface of said trunks, moving said vehicle in a direction opposite said first direction to cause said roller means to complete the initial fracture of said upwardly extending branches while simultaneously crushing downwardly extending branches beneath said trunk at a point adjacent their junction with said trunk.

3. A combination delimbing apparatus for use with a skidder or other vehicle having spaced vertically adjustable support arms comprising pusher means, means for mounting said pusher means on said support arms, an elongated roller, and means for rotatably mounting said roller adjacent the rear and lower portion of said pusher means.

4. The structure of claim 3 in which said means for mounting said roller adjacent the rear and lower portion of said pusher means includes hanger brackets carried by said support arms and bearing means on said brackets for mounting said roller.

5. The structure of claim 3 in which said pusher means includes a blade.

* * * * *